UNITED STATES PATENT OFFICE.

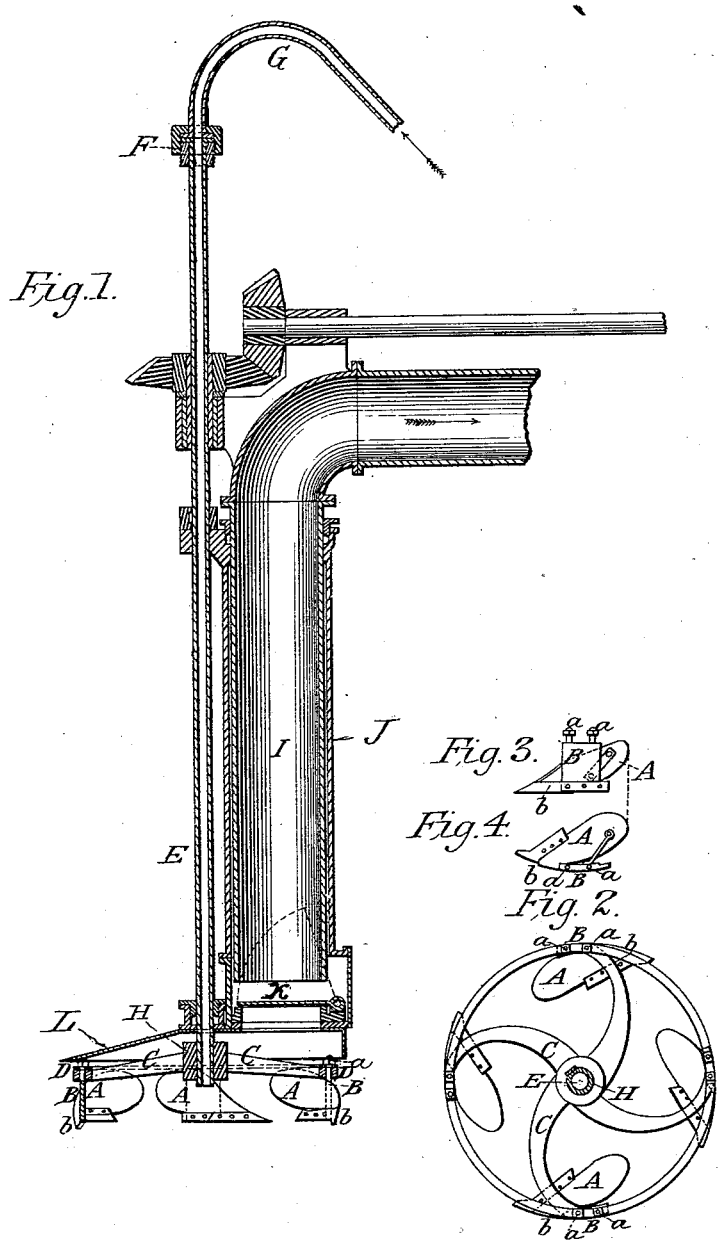

ALLEXEY W. VON SCHMIDT, OF SAN FRANCISCO, CALIFORNIA.

CURVED ROTATING PLOW FOR SUBMARINE WORK.

SPECIFICATION forming part of Letters Patent No. 277,177, dated May 8, 1883.

Application filed December 18, 1882. (No model.)

*To all whom it may concern:*

Be it known that I, ALLEXEY W. VON SCHMIDT, of the city and county of San Francisco, State of California, have invented a new and Improved Excavating Curved Rotating Plow for Submarine Work; and I do hereby declare that the following is a full and exact description thereof, reference being had to the accompanying drawings, and to the letters of reference marked thereon.

My invention relates to certain new and useful improvements in plows for submarine work.

It has for its object to so construct the plow that when connected with any suitable scow or float and properly geared with any suitable driving mechanism it may be readily rotated; and with these ends in view my invention consists of a rotary plow so curved on the landside that the rotary sweep of the plow will be within the circle described from the axis of motion of the plow; and my invention further consists in the details of construction necessary in the apparatus, as will be hereinafter more fully set forth.

In order that those skilled in the art to which my invention appertains may know how to make and use my improved plow, I will proceed to describe the construction and operation of the same, referring by letters to the accompanying drawings, and in which I have, for sake of convenience, omitted the scow or other float, as it will be clear to any one skilled how to rig the plow for work.

Figure 1 is a side elevation, representing a vertical section of my improved plow and necessary adjuncts. Fig. 2 represents a top view of the plow, with the driving-shaft shown in section. Fig. 3 represents a side view of one of the plows proper, and Fig. 4 a top view of the same.

Similar letters of reference denote like parts in the several views.

A represents a series of plows made in the ordinary manner, except that the landside b is curved in a line drawn from the axis of motion of the rotating ring-support. These plows A are secured in position, by vertical plates B and screw-bolts a, to circular frame or ring D, formed with radial wrought-iron arms C and hub H, the latter being secured by a feather, or in any other suitable manner, to a vertical hollow shaft, E, provided near its upper end with a bevel-gear meshing with a similar gear on the end of a horizontal driving-shaft, which may be driven by an engine on the scow or float. The vertical hollow shaft E is secured by any suitable means to bearings on the side of a vertical frame, which in the instance illustrated in the drawings consists of a hollow tube, J, the lower end of which is provided with a foot-valve, K, and within this tubular frame may be arranged a suction dredging-tube, I, the frame J and tube I being so arranged with reference to the ring-frame D of the plows that the material loosened by the plows will be dredged from the center.

It will be observed that the landside b of the plows, being curved, causes the sand, mud, &c., loosened by the plows to be swept to the center, where it can be readily acted upon by the dredge.

L is a hood arranged over the plows and their supporting ring-frame D to protect the same, and the plows are set at an angle, so as to cut slightly outside said hood.

To the upper end of the hollow shaft E, I connect, by a swivel-coupling, F, a hose, G, which I employ to conduct a stream of water under pressure, should the plows A be caved in on, this stream of water, as will be readily understood, serving to break up and scatter the sand or mud where it acts as an impediment to the action of the plows. The channel cut by the plows will be in the direction of the movement of the float or scow, on the same principle as a metallic "routing-machine."

I do not of course wish to limit myself to all of the exact details of construction shown, as they may be varied in many particulars without departing from the spirit of my invention— as, for instance, while I have shown the supporting-frame of the vertical shaft E as constituting a hollow tube with an exhaust or suction dredge-tube arranged within the same for the purpose of removing the material plowed up by the plows A, I may substitute therefor any suitable supporting-frame and employ any desired independent mechanism.

I have shown the ring-frame D armed with four plows A; but I do not wish to be confined in this particular, as a greater or less number of plows may be employed, the gist of my invention resting in the idea of the rotary plows formed with a curved landside and connected with a rotary frame, so that they may be rotated from a central driving-shaft, and in combining with such arrangement a means for flushing and disintegrating the material cut up by the plows by means of a stream of water under high pressure.

What I claim as new, and desire to secure by Letters Patent, is—

1. The plows A, provided with landsides b, curved to conform to the circle of their rotation, in combination with a rotary frame or ring, D, and driving-shaft E, substantially as and for the purpose set forth.

2. In combination with the plows A, provided with curved landsides, as described, and the revolving frame or ring D, the driving hollow shaft E, and suitable hose and connections, G F, substantially as and for the purpose set forth.

ALLEXEY W. VON SCHMIDT.

Witnesses:
 THOMAS D. MATHEWSON,
 JULIUS H. VON SCHMIDT.